July 5, 1949.  H. M. KINSLOW  2,474,946
WHEELED VEHICLE OF THE SCOOTER TYPE
Filed Jan. 19, 1946
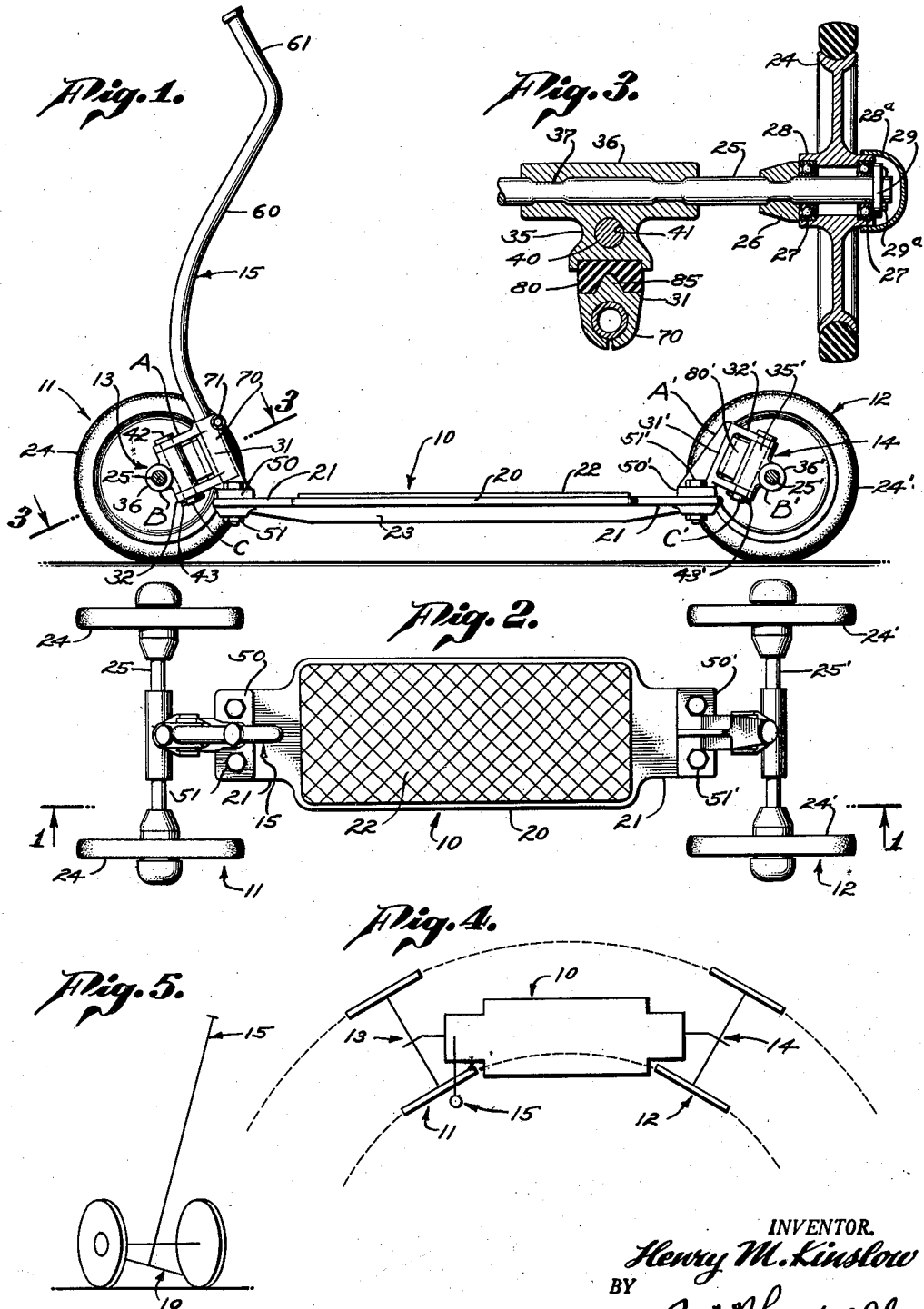
INVENTOR.
Henry M. Kinslow
BY
ATTORNEY Patented July 5, 1949

2,474,946

UNITED STATES PATENT OFFICE 2,474,946

WHEELED VEHICLE OF THE SCOOTER TYPE

Henry M. Kinslow, Pasadena, Calif.

Application January 19, 1946, Serial No. 642,284

4 Claims. (Cl. 280—87.04)

This invention has to do with a wheeled vehicle and it is a general object of the invention to provide a vehicle construction particularly applicable to small wheeled vehicles such as are generally known as scooters, such vehicles being characterized by a body in the form of a platform on which the operator usually stands, which body is supported by one or more wheels at each end.

It is a general object of my present invention to provide a wheeled vehicle which I will refer to as being of the scooter type, in which the body is so supported by the wheels as to be self-centering. With the construction and relationship of parts that I have provided the load being carried or the rider supported by the platform acts through the platform to normally tend to bring the structure to a normal central or neutral position where the vehicle moves straight forward.

It is another object of my present invention to provide a scooter type vehicle with wheel supports at each end of the body pivotally mounted or connected to the body through tiltable pivotal connections which are such that the vehicle may be guided or turned by tilting of such mountings.

It is a further object of the present invention to provide a scooter type vehicle such as I have referred to wherein there is means normally yieldingly tending to hold the parts in a normal or aligned position so the vehicle will move straight forward unless deliberately operated in a manner to turn to one side or the other.

It is a further object of my present invention to provide a scooter type vehicle of the general character referred to which is extremely simple and convenient to control. With the construction that I have provided there is a control element or post conveniently accessible to the operator and the vehicle can be guided by merely tilting the post.

It is a further object of my present invention to provide a scooter type vehicle of the general character referred to which is extremely simple and inexpensive of manufacture. The construction that I have provided involves few simple inexpensive parts, easily formed and very easily assembled to form a compact, practical, durable construction.

The various objects and features of my invention will be fully understood from the following detailed description of a typical preferred form and application of the invention, throughout which description reference is made to the accompanying drawings, in which:

Fig. 1 is a side view of a typical vehicle embodying the present invention taken immediately inside of the foremost wheels, or as indicated by line 1—1 on Fig. 2, showing the general relationship of the essential parts. Fig. 2 is a plan view of the vehicle. Fig. 3 is an enlarged detailed sectional view taken as indicated by line 3—3 on Fig. 1. Fig. 4 is a diagrammatic plan view of the vehicle illustrating the relationship of the parts as the vehicle is being turned, and Fig. 5 is a diagrammatic front view of the vehicle when it is being turned as shown in Fig. 4.

The vehicle that I have provided is generally of the type known as a scooter and although it may have a very wide range of use it is particularly suited for use as a toy, in which case it is propelled by the rider and is of light simple construction. In the drawings I have shown a form of the invention free of self-propelling means and of simple light construction. However, I do not wish to thereby limit myself to such elemental construction, but rather wish it understood that the principles that I have provided are applicable, generally, to wheeled vehicles regardless of their simplicity or complexity of construction, regardless of their size or intended use, and regardless of their means of propulsion.

The embodiment of the invention that I have illustrated includes, generally, a body 10 in the nature of an elongate rigid member, a front wheel support 11 for the body, a rear wheel support 12 for the body, a tiltable pitched pivotal connection 13 between the wheel support 11 and the forward end portion of the body, a tiltable pitched pivotal connection 14 between the wheel support 12 and the rear end portion of the body, means 15 for tilting the means 13 and 14, and various other features as will appear from the following description.

The body 10 of the vehicle is characterized by a single essential element or part which is preferably in the form of a platform 20. In the preferred form of the invention that I show in the drawings the body has end projections 21 at the ends of the platform which projections serve to carry the means 13 and 14. The platform 20 may, in practice, vary widely in size and shape although I prefer to make it substantially rectangular in plan configuration and dispose it to extend lengthwise of the vehicle. I prefer to make the top 22 of the platform flat and I preferably finish the top so that it presents a suitable tread or roughened surface on which a rider can stand without danger of slipping.

The end projections 21 of the body may be integral continuations of the platform. For example, they may be cast or otherwise formed integral with the platform and the construction may include reinforcing or stiffening ribs 23 which extend lengthwise of the platform and continue to the projections 21 so that the body as a while is a rigid, elongate member.

The wheel support 11 provided for the forward end portion of the body 10 preferably involves a pair of like wheels 24 supported for independent rotation. The simple form of the invention illustrated provides a plain straight axle 25 for supporting the wheels 24. In the arrangement of the invention illustrated the wheels are mounted to turn on the end portions of the axle and the particular construction shown involves a shoulder 26 on the axle near each end and a pair of spaced anti-friction bearings 27 supporting each wheel through its hub 28. The bearings 27 are carried in the end portions of the hub 28 and the assembly of the bearings and wheel are retained against the shoulder 26 by a retainer 29 held on the end of the axle by a key 29ª. The hub 28 of the wheel may carry a cap 28ª covering the end of the axle.

The pitched or inclined pivotal connection 13 provided between the wheel support 11 and the forward end portion of the body 10 is such that it is bodily tiltable to effect shifting of the position of the wheel support relative to the body to effect steering of the body in the desired manner. The pivotal connection 13 involves, primarily, a pivotal axis which is canted or inclined fore and aft of the longitudinal axis of the vehicle, which pivotal axis is fixed in a plane perpendicular to the body and extending longitudinally thereof. The axis of the pivotal connection preferably extends upward and forward at the forward end of the body 10 and although its pitch or inclination may vary somewhat I prefer to make it such as to form an angle of about 65° with the horizontal or with the surface over which the vehicle is operating.

The particular construction that I have shown in the drawings for establishing the desired inclined pivotal axis between the wheel support 11 and body 10 involves, generally, a yoke bracket A, a block B fitting the bracket and a pivot C pivotally connecting the block and bracket.

The yoke bracket A is preferably rigid with the body 10 being formed on or secured to the forward end portion of the body to project upward and forward therefrom in the manner illustrated in the drawings. The particular bracket construction that I have illustrated involves an arm 31 that extends upward and forward from the end projection 21 at the forward end of the body and spaced ears 32 on the arm. The ears 32 are spaced a suitable distance apart and project forward from the arm and with the arm form a yoke to receive the block B.

The block B of the means 13 has a bearing portion 35 that fits into the yoke to extend between the ears 32 and has a projection 36 which carries the axle 25 of the means 11. In the preferred construction the block B is a cast unit and for simplicity of construction it may be cast directly onto the axle 25 in which case I prefer to flatten the axle as at 37 so that it is keyed or locked to the block against longitudinal movement as well as against rotation relative to the block.

The pivot pin C may be a simple element having a portion 40 that extends through and between the ears 32 and which passes through a bore 41 provided in the bearing portion 35 of the block. The pivot pin shown in the drawings has a head 42 on one end engaging one ear 32 and is retained in position by a key 43 at its other end engaging the other ear 32.

The means 14 connecting the wheel support 12 and the rear end portion of the body 10 is similar, generally, to the means 13 except that the pitch or inclination of the pivotal axis of the means 14 is opposite to that of the pivotal axis of means 13. Where the pivotal axis of means 13 extends upward and forward from the forward end of the body 10 the pivotal axis of means 14 extends upward and rearward from the rear end of the body 10. The axes of the means 13 and 14 are not only pitched oppositely but it is preferred that they be equally pitched oppositely. In the preferred form of the invention that I have illustrated in the drawings the axes of the means 13 and 14 are opposite and equal so that they intersect at a point spaced a substantial distance below the plane of the top of the body 10 and intersect a perpendicular line passing through the body about midway between its ends.

The construction provided for the means 14 to establish the pivotal axes in the desired manner may vary widely. In the case illustrated the means 14 involving, generally, a yoke bracket A', a block B' and a pivot pin C' which parts correspond, generally to the means A, B and C of the means 13. The bracket A' has an arm portion 31' extending upward and rearward from the rear end portion of the body 10 and spaced ears 32' which project rearwardly from the arm and are normal thereto so that the arm and ears form a yoke that receives the block B'. The block B' has a bearing portion 35' that fits between the ears 32' and has a projection 36' that carries the axle 25' of means 12.

The means 12 may correspond in construction to the means 11, that is it may involve a pair of like independently rotatable wheels 24' and a simple axle 25' that carries the wheels through bearings such as I have described, and which is held by the projection 36' of the block in the manner that I have above described in connection with the means 11 and 13.

In the particular construction illustrated the arms 31 and 31' are formed separate from the body 10 being formed with flanges 50 and 50' respectively, which are secured to the end projections 21 of the body by bolts 51 and 51' or the like.

The means 15 provided for tilting the means 13 and 14 that I have described above preferably serves to simultaneously and equally tilt both means 13 and 14. In the preferred form of the invention the means 15 acts through the body 10 to tilt the means 13 and 14 this being accomplished through the rigid connection of the means 13 and 14 to end portions of the body. By reason of the rigid connections between the means 13 and 14 and the body 10 I can obtain the desired tilting of the means 13 and 14 by simply tilting the body in the desired manner. The preferred form of means 15 shown in the drawings involves a post 60 which is rigid with the body 10 and consequently with the means 13 and 14. The post preferably projects upward at the forward end portion of the body and is provided at its upper end with a grip 61 that can be conveniently engaged by the rider. The post 60 may, in practice, be secured or attached to the rigid unit formed by the body 10 and the arms of the means 13 and 14 in any suitable manner. In the particular construction illustrated a split sleeve portion 70 is formed on or in connection with the arm 31 of means 13 and the post 60 is an elongate tubular member having its lower end received in the sleeve 70 and made fast therein by a clamp screw 71 which tightens the sleeve onto the post. It will be seen from the drawings that the post 60 may be shaped or curved to bring the grip 61 into a position for convenient operation.

In the preferred form of my invention I provide means to normally yieldingly hold the means 13 and the means 14 in position so that the axles of the means 11 and 12 are normally at right angles to or transverse of the longitudinal axis of the vehicle. Various constructions may be provided to accomplish this. However, in practice I prefer to perform this function by means of a resilient or yielding member 80 incorporated in the means 13 and a corresponding yielding member 80' incorporated in the means 14. The yielding member is preferably a block or body of rubber or the like and it is carried in the yoke of bracket A or A' as the case may be to occur between the arm of the bracket and the bearing of the block. Where a yielding member or body or rubber is employed, as just described and as shown in Fig. 3 the opposing faces of the bracket arm and block bearing may be made substantially flat and one of these parts may have a rib or retaining part 85 fitting into the block of rubber to retain it in position.

The vehicle that I have provided can be handled or manipulated in various manners. However, in most instances, the rider or operator will stand on the top face 22 of the platform of the body 10 and where no power means is provided for driving the vehicle the rider may propel it by engaging the ground with his foot. Under normal conditions the pairs of wheels of means 11 and 12 stably support the body 10 and the yielding means or blocks 80 of rubber incorporated in the means 13 and 14 normally hold the axles of the means 11 and 12 transverse of the longitudinal axis of the vehicle so the body 10 is normally in a true horizontal position.

By reason of the means 13 and 14 projecting upward and forward and upward and rearward from the body, respectively, and by reason of the general relationship of the parts, as clearly shown in Fig. 1, the body 10 is, in effect, underslung relative to the wheel supports or in other words, is supported from the wheels for pivotal movement about an axis which is above the plane of the top of the body so that the load on the body or the weight of the rider on the body tends to hold the body down between the wheels in the normal position shown in Figs. 1 and 2 of the drawings. Because of the inherent construction or relationship of parts just referred to and because of the yielding means or rubber blocks 80 above described, the vehicle tends to normally remain in the position shown in Figs. 1 and 2 in that position it will run in the direction of the longtudinal axis of the body or straight ahead.

When it is desired to turn the vehicle to one side or the other it is merely necessary for the operator or rider to tilt the pivotal axes of the mountings 13 and 14. When the pivotal axes just referred to project upward and forward and upward and rearward from the ends of the body as I have described, the vehicle will turn in the direction desired when these axes are tilted in that direction, or in other words, if it is desired to turn the vehicle to the left the pivotal axes of the means 13 and 14 are tilted to the left and this can be done by merely tilting the control post 60 to the left. When the control post is thus tilted to one side as for instance to the left, as shown in Figs. 4 and 5 of the drawings, the tilting of the pivotal axis of the mounting means 13 shifts and the body 10 tilts so that when the vehicle is viewed from above, as shown in Fig. 4, the pivotal axis of means 13 extends forward and to the left so that the axle of means 11 instead of being truly transverse of the body is pitched or angularly related to the body, so that the left wheel of means 11 is moved closer to the body while the right wheel of means 11 is moved away from the body. As this tilting or turning of means 11 relative to the body occurs through tilting of the pivotal axis of the means 13 the body 10 not only tilts but lifts slightly and the weight of the rider tends to move the parts back to the normal or original position, with the result that the vehicle will only turn or remain in position to turn so long as the control post is held out of the neutral or perpendicular position.

The means 14 coupling the rear wheel support 12 with the rear end of the body 10 works similar but opposite to the means 13 so that when the post 60 is operated as above described the left wheel of means 12 is moved forward or toward the body while the right wheel is moved rearward or away from the body. By thus shifting both of the wheel supports 11 and 12 relative to the body and oppositely as I have described, and as shown in Fig. 4, I am able to turn the vehicle very sharply or on a very short radius. The wheels of both the front and rear wheels supports being independently rotatable, differential motion is free to occur between the left and right wheels as the vehicle is turned.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. A vehicle of the character described including, a substantially flat elongate body, two independently rotatable wheels carried by a front axle, means connecting said axle with the forward end of the body including a bracket confined to the forward end of the body and having a yoke, fastening means securing the bracket to the forward end portion of the body with the yoke above the plane of the body and facing forward of the body, and a block pivotally mounted in the yoke on a fixed axis pitched to extend upward and forward relative to the forward end of the body, and a wheel support for the rear end of the body.

2. A vehicle of the character described including, a substantially flat elongate body, two independently rotatable wheels carried by a front axle, means connecting said axle with the forward end of the body including a bracket confined to the forward end portion of the body and having a yoke above the plane of the body and facing forward of the body, fastening means securing the bracket to the body and a block pivotally mounted in the yoke on a fixed axis pitched to extend upward and forward relative to the forward end of the body, a rigid control post carried by the bracket projecting upward therefrom and a wheel support for the rear end of the body.

3. A vehicle of the character described including, a substantially flat elongate body, two independently rotatable wheels carried by a front axle, means confined to the forward end of the body connecting said axle with the forward end of the body including a bracket confined to the forward end portion of the body and having a yoke above the plane of the body and facing forward of the body, fastening means securing said bracket to the body and a block pivotally mounted in the yoke on a fixed axis pitched to extend upward and forward relative to the forward end of the body, two independently rotatable wheels carried by a rear axle, and means confined to the rear end of the body connecting the rear axle with the rear end of the body including a bracket confined to the rear end portion of the body and having a yoke above the plane of the body and facing rearward of the body, fastening means securing the last mentioned bracket to the body, and a block pivotally mounted in the yoke on a fixed axis pitched to extend upwardly and rearwardly relative to the rear end of the body.

4. A vehicle of the character described including, a substantially flat elongate body, two independently rotatable wheels carried by a front axle, means connecting said axle with the forward end of the body including a yoke above the plane of the body and facing forward of the body, and a block pivotally mounted in the yoke on a fixed axis pitched to extend upward and forward relative to the forward end of the body at an angle of about 65° with the plane of the body, two independently rotatable wheels carried by a rear axle, means connecting the rear axle with the rear end of the body including a yoke above the plane of the body and facing rearward of the body, and a block pivotally mounted in the yoke on a fixed axis pitched to extend upwardly and rearwardly relative to the rear end of the body at an angle of about 65° with the plane of the body, and a control post projecting upward from the body.

HENRY M. KINSLOW.

REFERENCES CITED

The following references are of record in the file of this patent:

UNITED STATES PATENTS

| Number | Name | Date |
|---|---|---|
| 1,070,468 | Henley | Aug. 19, 1913 |
| 1,213,454 | Brown | Jan. 23, 1917 |
| 1,450,342 | Walker | Apr. 3, 1923 |
| 1,530,165 | Fowler | Mar. 17, 1925 |
| 2,330,147 | Rodriguez | Sept. 21, 1943 |